United States Patent [19]

Jean-Luc et al.

[11] Patent Number: 4,688,627

[45] Date of Patent: Aug. 25, 1987

[54] DETECTING LEAKS IN A HEAT EXCHANGER IN OPERATION

[75] Inventors: Germain Jean-Luc, Chatou; Janneteau Eric, Rueil Malmaison; Loisy Francois, Courbevoie; Honore Joel, Paris, all of France

[73] Assignee: Electricite de France, Paris, France

[21] Appl. No.: 804,769

[22] Filed: Dec. 5, 1985

[30] Foreign Application Priority Data

Dec. 6, 1984 [FR] France ............................ 84 18644

[51] Int. Cl.[4] ............................................. G01M 3/04
[52] U.S. Cl. ..................................... 165/11.1; 73/40.7
[58] Field of Search .................. 165/11.1, 70; 73/40.7

[56] References Cited

U.S. PATENT DOCUMENTS

| | | | |
|---|---|---|---|
| 3,425,264 | 2/1969 | Frei | 73/40.7 X |
| 3,522,008 | 7/1970 | Defabaugh et al. | 165/11.1 X |
| 3,975,943 | 8/1976 | Brachet | 73/40.7 X |
| 4,226,113 | 10/1980 | Pelletier et al. | 73/40.7 |
| 4,232,546 | 11/1980 | Dumont | 73/40.7 |
| 4,328,700 | 5/1982 | Freis | 73/40.7 |
| 4,524,607 | 6/1985 | Pelletier et al. | 73/40.7 X |
| 4,557,139 | 12/1985 | Cantwell et al. | 73/40.7 |

OTHER PUBLICATIONS

Kutukcuoglu, A., "Heat Transfer to Superheated Steam Flowing in Tubes and Annular Channels", Marme-und Stoffubertragung, Bd3, vol. 3 (1970), pp. 174–184.

Primary Examiner—William R. Cline
Assistant Examiner—Randolph A. Smith
Attorney, Agent, or Firm—Larson and Taylor

[57] ABSTRACT

The process is suitable for detecting leaks in a heat exchanger for heat exchange between two gaseous fluids, for instance for super heating steam. The heat exchanger has a lower pressure fluid circuit and a higher pressure fluid circuit. A predetermined amount of a tracer gas, typically helium, is injected into the higher pressure fluid at the inlet of the heat exchanger and the presence of tracer gas within the lower pressure fluid is determined at the outlet of the heat exchanger. If the lower pressure gas is steam to be super heated, a minor amount of super heated steam is sampled at the outlet of the exchanger and is condensed. Then the uncondensable products are examined for presence of tracer gas.

7 Claims, 2 Drawing Figures

DETECTING LEAKS IN A HEAT EXCHANGER IN OPERATION

BACKGROUND AND SUMMARY OF THE INVENTION

The invention relates to the detection and the estimation of the size of leaks in a heat exchanger between two fluids mainly in gaseous form, using a tracer gas which will generally be helium, while the exchanger is operating. A particularly important application of the invention is the detection of leaks in a heat exchanger for superheating the steam between two turbine bodies of a thermal power station.

Numerous processes are already known for detecting leaks in heat exchangers. Many comprise checking by dilution of a tracer, which may be helium. This solution has drawbacks. It requires an accurate knowledge of the flow rates used and it is hindered by the recirculation of the fluids. Other known processes do not allow the size of the leaks to be determined, when they are small.

It is an object of the invention to provide a process and device for detecting leaks in an exchanger, allowing the appearance of a leak to be rapidly detected and its evolution followed, using only simple means and elements adaptable to several types of exchangers.

To this end, the invention provides a detection process in which a given amount of helium is injected in a short time into the high pressure fluid at the inlet of the exchanger and the possible presence of helium is determined in the low pressure fluid leaving the exchanger, once said injection has been carried out.

For assessing the size of the leak, a signal representative of the helium content of the low pressure fluid will be generally integrated in time after each injection. This operation may be carried out by a measurement device operating advantageously by mass spectrometry. For estimating or quantifying the leak, the detection device must be calibrated. This may be done by performing the same type of injection as for detection, but this time in the low pressure fluid upstream of the sampling point.

Because of the "pulsed" character of the injection, a costly device for premixing with known concentration may be dispensed with and possible accumulation and recirculation of the helium forming the tracer gas may be avoided.

In the application of the invention to the detection of leaks in a steam superheating exchanger, a fraction of the superheated steam is condensed at the outlet of the exchanger, gas is extracted from the condensation water and the presence of the tracer gas is sought in the uncondensable gses.

The invention also provides a device for detecting and assessing leaks in a heat exchanger when this latter is operating, comprising means for the temporary storage of a given amount of tracer gas, means for rapidly driving said amount into the high pressure fluid inlet of the exchanger, means for taking off a sample of the low pressure fluid at the outlet of the exchanger and for conditioning the fluid so as to extract therefrom the tracer gas, if any, and means for measuring the amount of tracer gas collected.

The measuring means comprise advantageously a mass spectrometer associated with a fixed flow sampling system or "breather" aspirating a part of the uncondensable gases after condensation of the fluid in the case where this latter is steam.

The whole of the device may be controlled by a programmable controller. This causes successive measuring sequences to be carried out, determines the involved amounts from data delivered by pressure sensors and detector means. The whole of the device may be carried on a vehicle for transport from one exchanger to another. In this case, it will be sufficient for the exchangers to have connections intended to receive flexible pipes belonging to the device.

The invention will be better understood from the following description of a particular embodiment, given by way of non limitative example.

SHORT DESCRIPTION OF THE DRAWINGS

FIG. 1 is a general diagram of a device of the invention, for detecting possible leaks in a heat exchanger forming a steam superheater, and for assessing the size of possible leaks; and FIG. 2 is a general diagram of means for injecting known amounts of helium into the high pressure and low pressure circuits of the exchanger.

DESCRIPTION OF A PREFERRED EMBODIMENT

Figure 1:
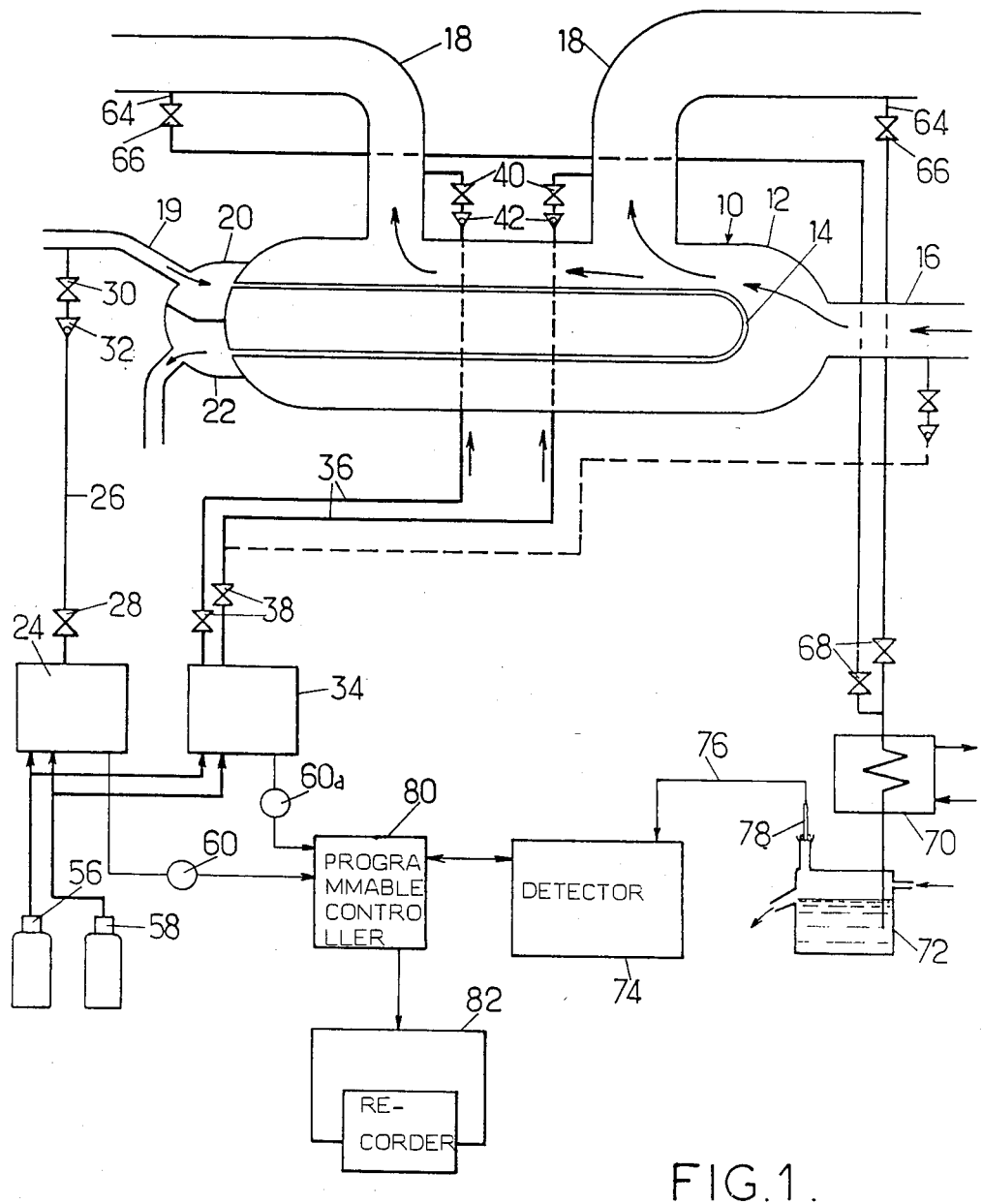

The embodiment of the invention which will be described is more especially usable for detecting leaks in a heat exchanger 10 of the type shown in FIG. 1, comprising a casing 12 occupied by the low pressure fluid (steam to be super heated). The high pressure fluid circuit (super heating steam) comprises a U-shaped tube bundle 14 contact with the low pressure fluid. This latter, formed by saturated steam, enters the casing through an inlet 16. It leaves through one or more outlets. As illustrated, two outlets 18 have been shown.

The super heating steam circuit comprises an inlet duct 19, a distributor box 20, the bundle of tubes 14 and an outlet box 22.

The pressure in tubes 14, 55 bars for example, is very much greater than that which prevails in casing 12, so that possible leaks will take place from the super heating steam towards the steam to be super heated.

The leak detection device of the invention may be regarded as comprising means for the temporary storage of a given amount of helium, means for rapidly driving this amount of helium into the steam super heating inlet, means for sampling and conditioning the steam to be analyzed and measurement and diagnosis assistance means. These means will be successively described.

The temporary storage and ejection means 24 may have the construction shown in FIG. 1. These means allow an amount of helium whose volume and pressure are known to be injected into duct 19, by driving with an inert gas which will generally be nitrogen.

Injection must be carried out rapidly. In practice, the helium "plug" and the amount of inert vector gas which pushes it must pass into the inlet duct 19 within a time less than 10 seconds, which will in general be between 3 and 10 seconds. The volume of helium injected depends on the desired detection threshold. In practice, an amount of helium will generally be injected corresponding to a volume of 10 liters under normal temperature and pressure conditions.

Means 24 may form an assembly connected to duct 19 through a stainless steel pipe 26, having a sufficient inner diameter for reducing pressure losses (6 to 10 mm in general). The pipe is equipped at its ends with cut-off valves 28 and 30. It will also generally comprise a non return valve 32 for limiting the return of steam towards the storage and injection means.

The same storage and injection means may also be used for providing calibration. But this solution has disadvantages. In fact, it is preferable to provide calibration by injecting a smaller volume of helium than for the measurement (0.5 Nl instead of 10 Nl for example). In addition, the injection takes place under a lower pressure. An advantageous solution, shown in FIGS. 1 and 2, consists in providing separate calibration means 34, of a construction similar to that of the injection means, connected to the low pressure fluid circuit (steam to be super heated). In the case illustrated in FIG. 1, where there are several super heated steam outlets, the calibration means 34 are connected to each of the outlets 18 by a pipe 36 having, like pipe 26, isolating valves 38 and 40 and a non return valve 42.

When the device is to be movable, pipes 26 and 36 are provided for connection to the exchanger, not directly but through flexible pipes capable of withstanding the required injection pressures.

Figure 2:
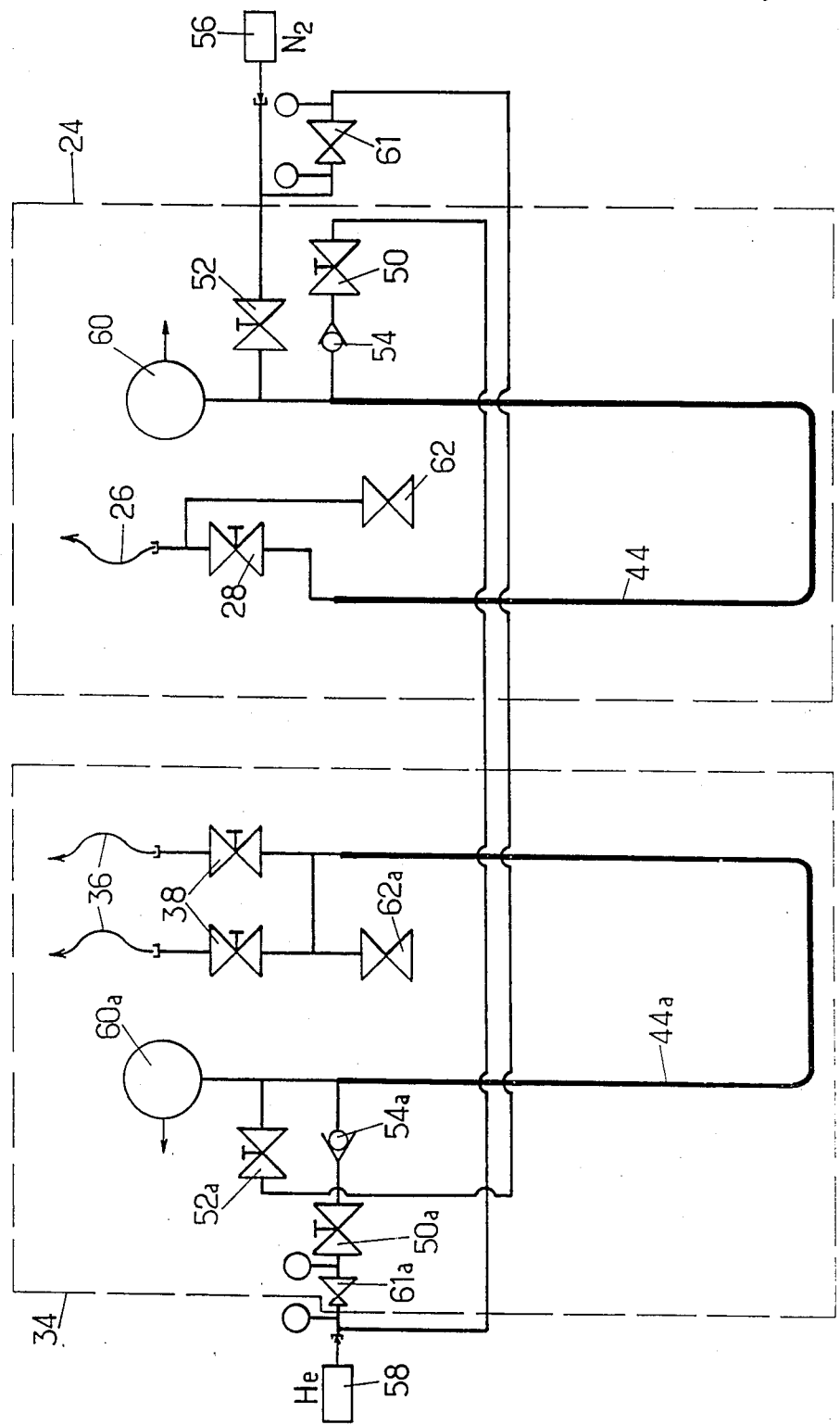

The temporary storage and injection means 24 shown in FIG. 2 comprise a calibrated volume, formed for example by a simple bent pipe 44 having at its ends pneumatic or electromagnetic controlled rapid operation valves. The volume of pipe 44 of FIG. 2 is provided with a downstream valve 28 and upstream valves 50 for the intake of helium and 52 for the intake of nitrogen. A non return valve 54 prevents reflux towards the injection means. The gas supplies may be formed by nitrogen and helium cylinders fitted with respective pressure reducing valves 56 and 58 reducing the pressure to a value which is for example 65 bars when the pressure of the super heated steam is 55 bars. Generally, the pressure delivered by the pressure reducers must be equal to that of the super heating value increased by the pressure losses which occur during injection. The calibrated volume of pipe 44 is provided with a pressure gauge 60 delivering a signal representative of the pressure which reigns therein.

The nitrogen supply pressure will advantageously be chosen slightly greater than that of the helium so as to avoid any uncontrolled mixing due to the gases. Finally, volume 44 is provided with a drain valve 62.

Calibration means 34 shown in FIG. 2 comprise elements corresponding to those of the storage and injection means. For this reason they are designated by the same reference number to which the index a is added. Volume 44a will generally be of the order of a tenth of volume 44, for example 100 cm³ instead of 1 liter. The pipes are in all cases provided for allowing a pulsed type injection which generally requires a flow rate of about 30 Nl/s. The helium and nitrogen sources may be common to means 24 and 34. Shut off valves 61 are then provided for isolating means 24 and 34.

The sampling means (FIG. 1) comprise a tapping 64, having a shut off valve 66, at each of the outlets 18. The tappings 64 must be at a sufficient distance from casing 10 and from the injection points of the calibration means for there to be homogenization. In practice, a distance of at least ten times the diameter of the pipe is sufficient. The tappings are connected, through respective flow rate adjustment valves 68, to the conditioning means which comprise a cooler 70 and a gas extractor 72 in the case of application to a steam super heater. Tappings 64 are provided so as to deliver a flow rate guaranteeing the required sensitivity. In practice, a flow rate between 0.5 and 1 kg/min will be generally satisfactory. It corresponds to about 0.5 l/s of steam.

The products leaving the cooler 70 comprise, in the case of application to a super heater, water and uncondensable gases. These products are fed as a whole to the gas extractor 72. The uncondensable gases are aspirated out of the condenser and are sent to a detector 74. This detector may be more especially a mass spectrometer, connected to the gas extractor through a duct 76 and a "breather" 78 formed by a very hard material insert, such as a synthetic ruby pierced with a hole of small diameter, for example about 50 micron. A filter is advantageously provided upstream of the insert for avoiding clogging of the orifice by dust. The mass spectrometer will be set to a spectral ray of the tracer gas, generally helium.

The sequence of operations is advantageously controlled by programmable automatic device 80 comprising a microprocessor which, from the signals received from the detector and the pressure gauges, determines the helium concentration and derives the size of the leak therefrom. The automatic device 80 may be associated with a recorder 82.

The detection sensitivity may be determined by working out the ratio of the amount of helium received, determined by integration, to the amount of helium injected at 18 during calibration. The leak quotient is determined by working out the ratio between the amount of helium received determined by integration, to the amount of helium injected into the high pressure circuit. The ratio between leak quotient and detection sensitivity gives the fraction of gas escaping through the leak.

It has been discovered that leaks may be detected representing a fraction of the gas flow introduced into the high pressure circuit as small as 0.1%.

The automatic microprocessor device may be adapted for automatically changing the caliber of detector 74 as a function of the measured concentration, so as to increase the measuring dynamics which may go from 0.2 vpm to about 1% of helium in a representative example.

The device is susceptible of numerous variants. For example, the calibration injection may take place upstream of casing 12, in the low pressure circuit, as is shown with broken lines in FIG. 1.

The process of the invention may be put into effect in the following way, using the device which has just been described.

First of all the sampling and conditioning means are connected by means of at least one tapping 64. The ducts may have a sufficient diameter for the sampled flow to provide a gas flow rate guaranteeing the required sensitivity (between 0.5 and 1 kg/min for current gas extractors). The temperature downstream of the cooler must be less than that of the ambient air, so as to avoid any additional condensation upstream of the gas extractor 72. The injection pipes 26 and 36 are connected.

Once these connections are made, calibration may be carried out by injecting helium into the low pressure circuit, of of the order of 12 bars in general.

The injection operation will generally comprise three phases, in the case of a super heater, for avoiding the risk of the presence of water in pipes 36 downstream of valves 38, it is preferable to drain these pipes by driving out any water with pressurized nitrogen. For that, the nitrogen pressure is adjusted to its nominal value (vapor pressure+pressure loss, i.e. for example 16 bars), which may be checked with the pressure gauge 60a. Valves 61a and 52a are open. Then valves 38 are possibly opened so as to allow the nitrogen to drive out the water. When valve 50a is then closed the pressure gauge 60a indicates a pressure equal to the vapor pressure if the pipe is indeed free of water. The calibrated volume 44a may then be isolated by closing valve 38.

The helium must then be admitted to the volume 44a. Two procedures may be envisaged:

helium is admitted so as to cause the initial pressure of 12 bars to pass to a pressure close to that of the nitrogen, for example 15 bars. The amount of helium then stored temporarily in volume 44a will be equal to the pressure difference multiplied by the volume;

or volume 44a is drained by means of valve 62a then this volume is inflated with helium so as to pass from atmospheric pressure to the required pressure.

The injection properly speaking takes place by opening the nitrogen supply valve 52a, then the injection valve 38, both abruptly. The nitrogen then drives the helium out of pipe 36. The injection multiplied by the flow rate must be three to five times the volume, so as to entirely scavenge the helium.

Then the calibrated volume 44a is isolated by closing successively the valves 52a, then 38.

In practice, the whole of the cloud of helium coming from a possible leak is detected in less than a minute and the time for recovery of the signal is less than five minutes. The total calibration time, including draining of the water, is less than ten minutes.

Finally, the calibration is finished by lowering the pressure by opening the drain valve 62a.

Each measurement properly speaking corresponds to an injection of helium into the high pressure circuit. The operating mode is the same as the one which has just been described, except that the helium pressure is higher and the amount is greater so as to have sufficient sensitivity. If for example the super heating vapor pressure is 55 bars, the nitrogen pressure may be 66 bars and the helium pressure 65 bars.

The automatic device may be programmed so as to periodically repeat the detection sequences and, should helium be present, to increase the measuring rate. The device may also be placed as a whole on a vehicle and allow periodic controls or, when a leak has been detected, its evolution may be monitored.

What is claimed is:

1. A process for detecting leaks in a heater exchanger for heat exchange between two substantially gaseous fluids circulating within said heat exchanger, one of said fluids being at a higher pressure and the other at a lower pressure, comprising:

temporarily storing a first predetermined amount of tracer gas;

carrying out calibration by injecting said first predetermined amount of a tracer gas into the lower pressure fluid before it enters the heat exchanger while the heat exchanger is operating and detecting said tracer gas in said lower pressure fluid leaving said exchanger; and repeating the following steps:

(a) temporarily storing a second predetermined amount of tracer gas;

(b) injecting said second predetermined amount of the tracer gas into the higher pressure fluid before said higher pressure fluid enters the heat exchanger while the heat exchanger is operating; and (c) detecting the presence of said tracer gas in the lower pressure fluid leaving the exchanger after said injection has been completed, and generating a signal representative of the content of the tracer gas in said lower pressure fluid leaving the exchanger after each injection, said signal being time integrated.

2. A process according to claim 1 for detecting leaks in a heat exchanger for super heating steam constituting said lower pressure fluid, wherein step (b) includes condensing a minor part of the super heated steam flow leaving the heat exchanger, degasing the condensation water and sensing the uncondensable gases resulting from degasing for tracer gas.

3. A process according to claim 1, wherein said second predetermined amount of tracer gas is stored in a calibrated enclosure and then forced into said heat exchanger during step (b) with pressurized inert driving gas within a period lower than 10 seconds.

4. A process according to claim 1, wherein the tracer gas is helium.

5. A device for detecting and assessing the size of leaks in a heat exchanger during operation thereof, said heat exchanger having a circuit for a higher pressure gas and a circuit for a lower pressure gas in mutual heat transfer contact, comprising:

(a) means for temporary storage of a first predetermined amount of said tracer gas;

(b) means for rapidly forcing said first predetermined amount into the lower pressure gas of said heat exchanger at an inlet of the lower pressure gas circuit;

(c) means for sampling the lower pressure gas at an outlet of said lower pressure gas circuit following admission of said tracer gas into said lower pressure gas circuit;

(d) means for temporarily storing a second predetermined amount of tracer gas, said second predetermined amount being higher than said first predetermined amount;

(e) means for rapidly forcing said second predetermined amount into said inlet of said higher pressure gas circuit;

(f) means for sampling the higher pressure gas at an outlet of said higher pressure gas circuit following admission of said tracer gas into said higher pressure gas circuit;

(g) means for extracting tracer gas which is possibly present from the sample; and (h) means for measuring the quantity of extracted tracer gas.

6. A device according to claim 5, wherein the measuring means comprise a mass spectrometer and the sampling means comprise means for aspirating a predetermined minor flow rate of said lower pressure fluid.

7. A device according to claim 5, for detecting leaks in a heat exchanger for super heating steam constituting said lower pressure gas, wherein said aspirating device includes means for condensing steam and aspirating part of the uncondensable gases present in said steam.

* * * * *

UNITED STATES PATENT AND TRADEMARK OFFICE
CERTIFICATE OF CORRECTION

PATENT NO. : 4,688,627

DATED : August 25, 1987

INVENTOR(S) : GERMAIN et al

It is certified that error appears in the above-identified patent and that said Letters Patent is hereby corrected as shown below:

```
Title page:  Item [75] should read as follows:

[75] Inventors:   Jean-Luc GERMAIN, Chatou;
                     Eric JANNETEAU, Rueil Malmaison;
                     Francois LOISY, Courbevoie;
                     Joel HONORE, Paris, all of France
```

Signed and Sealed this

First Day of March, 1988

Attest:

DONALD J. QUIGG

*Attesting Officer*   Commissioner of Patents and Trademarks